United States Patent
Tamura

(10) Patent No.: US 9,356,801 B2
(45) Date of Patent: May 31, 2016

(54) APPARATUS AND METHOD FOR ESTABLISHING CONNECTIONS WITH A PLURALITY OF VIRTUAL NETWORKS

(75) Inventor: Yoshio Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 859 days.

(21) Appl. No.: 13/025,523

(22) Filed: Feb. 11, 2011

(65) Prior Publication Data

US 2011/0228787 A1 Sep. 22, 2011

(30) Foreign Application Priority Data

Mar. 17, 2010 (JP) ................................ 2010-061658

(51) Int. Cl.
| | |
|---|---|
| H04L 12/46 | (2006.01) |
| H04W 4/00 | (2009.01) |
| H04W 8/26 | (2009.01) |
| H04W 48/18 | (2009.01) |
| H04W 76/02 | (2009.01) |
| H04W 88/08 | (2009.01) |

(52) U.S. Cl.
CPC ............ *H04L 12/4662* (2013.01); *H04W 4/00* (2013.01); *H04W 8/26* (2013.01); *H04W 48/18* (2013.01); *H04W 76/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,636,360 B2 | 12/2009 | Nagai et al. | |
| 2006/0274744 A1 | 12/2006 | Nagai et al. | |
| 2006/0291660 A1* | 12/2006 | Gehrmann et al. | 380/277 |
| 2007/0053508 A1* | 3/2007 | Yasumoto | 380/28 |
| 2008/0304456 A1* | 12/2008 | Iino et al. | 370/338 |

FOREIGN PATENT DOCUMENTS

JP 2006-345088 12/2006

* cited by examiner

*Primary Examiner* — Hassan Phillips
*Assistant Examiner* — Gautam Sharma
(74) *Attorney, Agent, or Firm* — Katten Muchin Rosenman LLP

(57) ABSTRACT

A communication system provides one or more services using a plurality of virtual networks provisioned in a network. A communication device belonging to at least one of the plurality of virtual networks is provided with service-ID associating information in which a service-ID identifying a service is associated with at least one virtual network identifier each identifying a virtual network that is included in the plurality of virtual networks and is to be used for providing the service. A base station transmits a service-ID association request to the communication device which then returns the stored service-ID associating information to the base station. Thereafter, the base station selects, from among the plurality of virtual networks, at least one virtual network that is to be used for providing a service identified by the service-ID, based on the service-ID associating information, and establishes a connection with the selected at least one virtual network.

6 Claims, 12 Drawing Sheets

APPARATUS AND METHOD FOR ESTABLISHING CONNECTIONS WITH A PLURALITY OF VIRTUAL NETWORKS

CROSS-REFERENCE TO RELATED APPLICATION

This application is based upon and claims the benefit of priority of the prior Japanese Patent Application No. 2010-061658, filed on Mar. 17, 2010, the entire contents of which are incorporated herein by reference.

FIELD

The present invention relates to an apparatus and method for establishing connections with a plurality of virtual networks.

BACKGROUND

In these latter days, in a mobile network, Ethernet or an IP (Internet Protocol) network have been widely used as a core network for a base station. In order to connect with the IP network, the base station needs to obtain an IP address available for the base station. Acquiring an available IP address may be accomplished, for example, by obtaining the available IP address from a DHCP (Dynamic Host Configuration Protocol) server or by directly inputting the available IP address into the base station from a maintenance terminal.

Further, in the case of establishing a VLAN (Virtual Local Area Network) on the Ethernet, a VLAN-ID needs to be set to each of base stations. Setting of a VLAN-ID to each of the base stations, for example, may be performed manually by a user of the VLAN.

In recent years, it has been required by 3GPP (3rd Generation Partnership Project) or common carriers, to automatically startup a base station, for example, using a plug-in method as one of SON (Self Organizing Network) functions. The SON allows a base station to automatically connect with a network at the time of installing the base station by automatically obtaining available IP addresses using a DHCP even if the available IP addresses are not stored beforehand in the base station.

Japanese Laid-open Patent Publication No. 2006-345088 discloses, as a related art, a method in which any or unique VLAN-ID is dynamically assigned to a user terminal that is connected with a network, and data communication is performed using the assigned VLAN-ID.

However, according to the above mentioned related art, there is a problem such that it is difficult for a base station to acquire information identifying one of VLANs that is to be used for providing each of services. For example, when a different VLAN is set for each of different services such as a C-Plane and a U-plane, the base station is unable to automatically acquire information identifying one of VLANs that is to be used for providing each of the C-Plane and the U-plane, thereby failing to connect with a VLAN that is to be used for providing each of the C-Plane or the U-plane.

Consequently, for example, since the base station is unable to connect with a DHCP server that is coupled to the base station via a VLAN, the base station fails to obtain available IP addresses from the DHCP server, and also fails to start data transmission based on IP. In this way, according to the above mentioned related art, it may be difficult to implement an automatic startup of a base station using a plug-in method.

SUMMARY

According to an aspect of an embodiment, there is provided apparatus and method for providing one or more services using a plurality of virtual networks provisioned in a network. Service-ID associating information is stored in a communication device belonging to at least one of the plurality of virtual networks, in which a service-ID identifying each of the one or more services is associated with at least one virtual network identifier each identifying a virtual network that is one of the plurality of virtual networks and is to be used for providing the each of the one or more services. Each of one or more base stations transmits a service-ID association request to the plurality of virtual networks via the network so as to acquire the service-ID associating information from the communication device, and receives the service-ID associating information from the communication device via the network in response to the service-ID association request. The communication device, upon receiving the service-ID association request via the network from the each of the one or more base stations, transmits the service-ID associating information stored in the communication device to the each of the one or more base stations via the network. Thereafter, the each of the one or more base stations selects, from among the plurality of virtual networks, at least one virtual network that is to be used for providing a service identified by a given service-ID, based on the service-ID associating information received from the communication device, and establishes a connection with the selected at least one virtual network so as to provide the service identified by the given service-ID using the selected at least one virtual network.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

The preferred embodiments of the present invention will be described below with reference to FIGS. 1 to 12. According to the embodiments, an identifier is assigned to each of the various types of services to be provided, which is hereinafter referred to as "a service-ID". Further, information indicating association between services to be provided and a plurality of virtual networks to be used for providing the services, which is hereinafter referred to as "service-ID associating information", is stored in a communication device that is installed on a virtual network (for example, VLAN), and the communication device transmits the service-ID association information to a base station upon receiving a request message, which is hereinafter referred to "a service-ID association request", from the base station. This will allow the base station to easily establish a connection with a virtual network (for example, VLAN) associated with each of one or more services to be provided.

Figure 1:
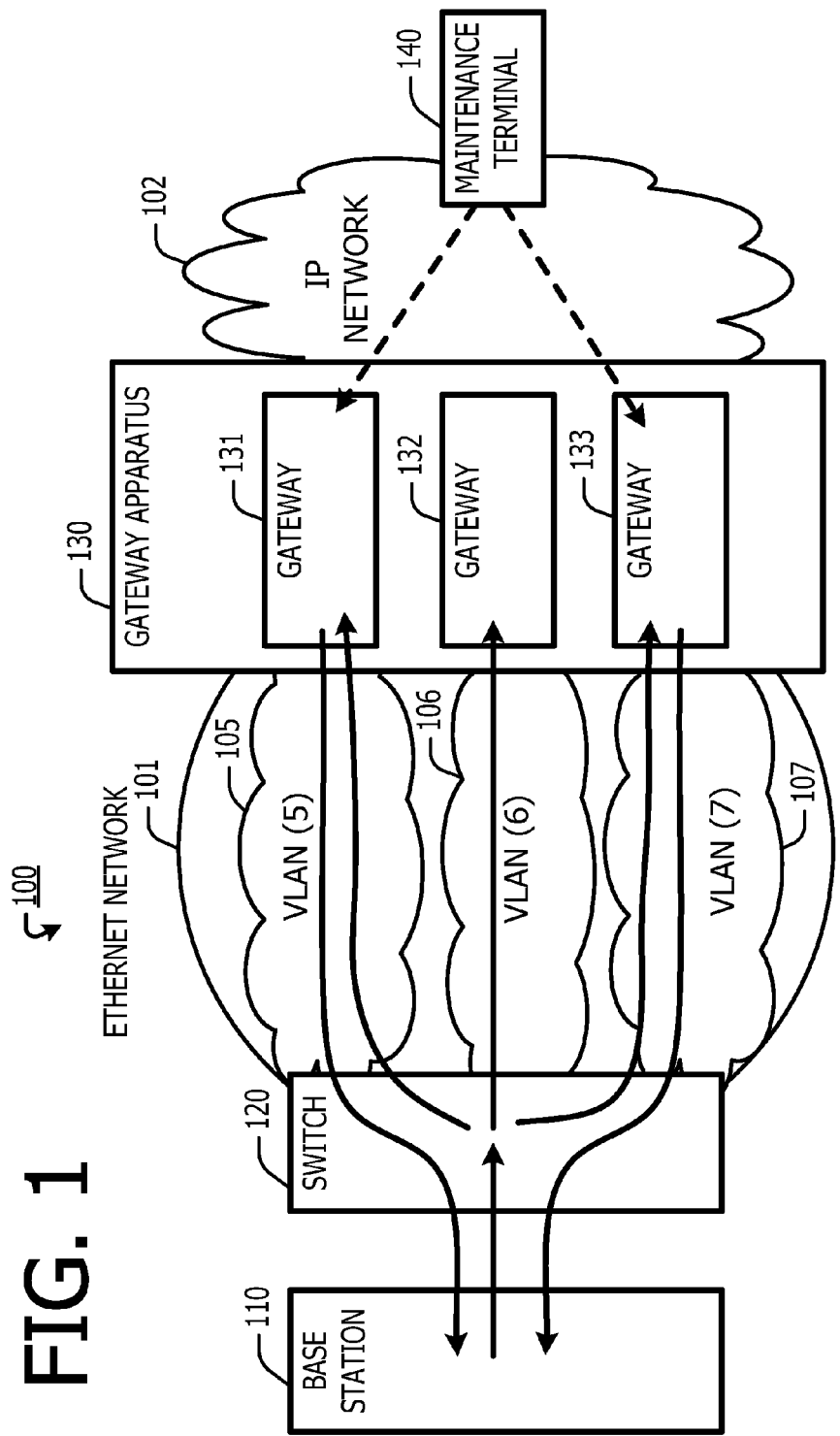
FIG. 1 is a diagram illustrating a configuration example of a communication system, according to an embodiment.

FIG. 1 is a diagram illustrating a configuration example of a communication system, according to an embodiment. As depicted in FIG. 1, communication system 100 according to an embodiment includes, for example, base station 110, switch 120, gateway apparatus 130, and maintenance terminal 140. In the example of FIG. 1, switch 120 and gateway apparatus 130 are installed on Ethernet network 101. In FIG. 1, gateway apparatus 130 may be configured to include one or more gateways each belonging to one of a plurality of virtual networks, for example, VLANs 105, 106, 107. Hereinafter, description will be given of a VLAN, as a representative example of a virtual network.

Ethernet network 101 may be configured to be a communication network in which a plurality of virtual networks (for example, VLANs 105 to 107) are provisioned. In this case, for example, VLAN-IDs "5" to "7" (denoted by figures in parentheses of FIG. 1) are assigned to VLANs 105 to 107, respectively. Here, each of VLANs 105 to 107 may be used for providing at least one of various types of services, such as a C-Plane service and a U-Plane service, and a service-ID is assigned to each of the various types of services.

Base station 110 may be configured to be a base station capable of connecting with Ethernet network 101. For example, base station 110 may be configured to connect with Ethernet network 101 directly or via switch 120. In the following description, it is assumed that network 101 is an Ethernet network and switch 120 is arranged between base station 110 and Ethernet network 101, as a representative network configuration. However, base station 110 may be configured to directly communicate with Ethernet network 101 without intervening switch 120. Further, network 101 may be configured to be a network other than an Ethernet network. Base station 110 performs, for example, a radio communication with a mobile station, and relays transmission data between the mobile station and Ethernet network 101, or between the mobile station and IP network 102.

When base station 110 is not storing service-ID associating information identifying association of service-IDs with VLAN-IDs, base station 110 transmits, to VLANs 105 to 107, "a service-ID association request" for acquiring "service-ID associating information". For example, base station 110 may be configured to use a VLAN frame including a predetermined specific VLAN-ID as "a service-ID association request". In the case, base station 110 transmits a VLAN frame including the predetermined specific VLAN-ID to switch 120. Transmission of the service-ID association request (for example, a VLAN frame including a predetermined specific VLAN-ID) may be, for example, performed at the time when base station 110 establishes a connection with Ethernet network 101. Further, base station 110 may be configured to transmit a service-ID association request including a connection interface address identifying a connection interface of base station 110. Here, a MAC address (a physical address) assigned to base station 110 may be used as a connection interface address.

A service-ID association request is a signal for requesting a communication device (in the case, gateway 130) to provide service-ID associating information in which a service-ID identifying each of one or more services to be provided is stored in association with at least one virtual network identifier each identifying a virtual network that is included in the plurality of virtual networks and is to be used for providing the each of the one or more services. For example, the service-ID association request may be configured to be a VLAN frame including a predetermined specified VLAN-ID that is set to a VLAN tag of the VLAN frame. Here, a VLAN-ID that is not assigned to any one of the plurality of virtual networks (for example, VLANs 105 to 107) may be used as the predetermined specified VLAN-ID.

Further, when base station 110 is storing the service-ID associating information, base station 110 transmits, to switch 120, a normal VLAN frame that is destined for one of the plurality of virtual networks (for example, VLANs 105 to 107). Here, a VLAN frame that is to be transmitted to IP network 102 via one of VLANs 105 to 107 is also regarded as a normal VLAN frame.

Switch 110 may be configured to includes a memory in which information identifying a service-ID association request, for example, the predetermined specific VLAN-ID, is stored. Switch 120, upon receiving a service-ID associating request from base station 110, transmits the received service-ID associating request to VLANs 105 to 107. For example, upon receiving a VLAN frame including the predetermined specific VLAN-ID from base station 110, switch 120 transmits the received VLAN frame to all the VLANs 105 to 107. Transmission of the VLAN frame including the predetermined specific VLAN-ID, for example, may be performed using a broadcast communication method.

Further, upon receiving a normal VLAN frame including a VLAN-ID identifying one of the plurality of VLANs 105 to 107, which is hereinafter referred to as "a destination VLAN", switch 120 transmits the received normal VLAN frame to the destination VLAN identified by the VLAN-ID. Transmission of the normal VLAN frame including the VLAN-ID identifying the destination VLAN, for example, may be performed using a unicast communication method.

Further, switch 120 transfers service-ID associating information received from a communication device, for example, gateway apparatus 130, to base station 110. Switch 120 may be, for example, configured to be a L2 SW (Layer 2 Switch).

Gateway apparatus 130 may be configured to include, for example, gateways 131 to 133 each functioning as a communication device according to an embodiment. Here, each of gateways 131 to 133 (a communication device) may be configured, for example, to be a L3 SW (a Layer 3 Switch). Further, a gateway (a communication device) may be configured to include a memory in which the above mentioned predetermined specific VLAN-ID is stored. Gateways 131 to 133 are communication devices that are provided for the plurality of VLANs 105 to 107, respectively. In other words, gateways 131 to 133 belong to VLANs 105 to 107, respectively. Gateways 131 to 133, for example, may connect VLANs 105 to 107 with IP network 102 (another network), respectively. VLAN frames that have been transmitted from switch 120 to VLANs 105 to 107 are received by gateways 131 to 133, respectively.

Gateway 131 functions as a communication device belonging to VLAN 105, and may be configured to store service-ID associating information in which VLAN-ID "5" identifying VLAN 105 is associated with a service-ID identifying a service to be provided by using VLAN 105. Gateway 131, upon receiving service-ID association request from base station 110, transmits the service-ID associating information stored in gateway 131 to base station 110. For example, gateway 131 transmits the service-ID associating information to base station 110 by transmitting, via VLAN 105 to which gateway station 131 is belonging, a VLAN frame that includes the service-ID associating information and includes, as a destination address, a physical address assigned to a connection interface of base station 110 via which the service-ID association request has been transmitted.

In the similar manner, gateways 132, 133 may be configured to function as communication devices belonging to VLAN 106, 107, respectively. For example, gateways 132 may be configured to store service-ID associating information in which VLAN-ID "6" identifying VLAN 106 is associated with a service-ID identifying a service to be provided by using VLAN 106, and gateways 133 may be configured to store service-ID associating information in which VLAN-ID "7" identifying VLAN 107 is associated with a service-ID identifying a service to be provided by using VLAN 107. Upon receiving a service-ID association request from base station 110, gateways 132, 133 transmit, to base station 110, service-ID associating information stored in gateways 132, 133, via VLANs 106, 107, respectively. In the example of FIG. 1, gateway apparatus 130 is configured to include three communication devices 131, 132, 133. However, gateway apparatus 130 may be configured to include only one communication device, for example, gateway 131. In this case, gateway 131 may be configured to belong to multiple virtual networks, for example, VLANs 105, 106, 107.

Maintenance terminal 140 may be configured to set service-ID associating information to gateways 131 to 133. For example, maintenance terminal 140 may set service-ID associating information to gateways 131 to 133 via IP network 102. It is also possible to perform setting of service-ID associating information by directly connecting maintenance terminal 140 with gateways 131 to 133.

Figure 2:
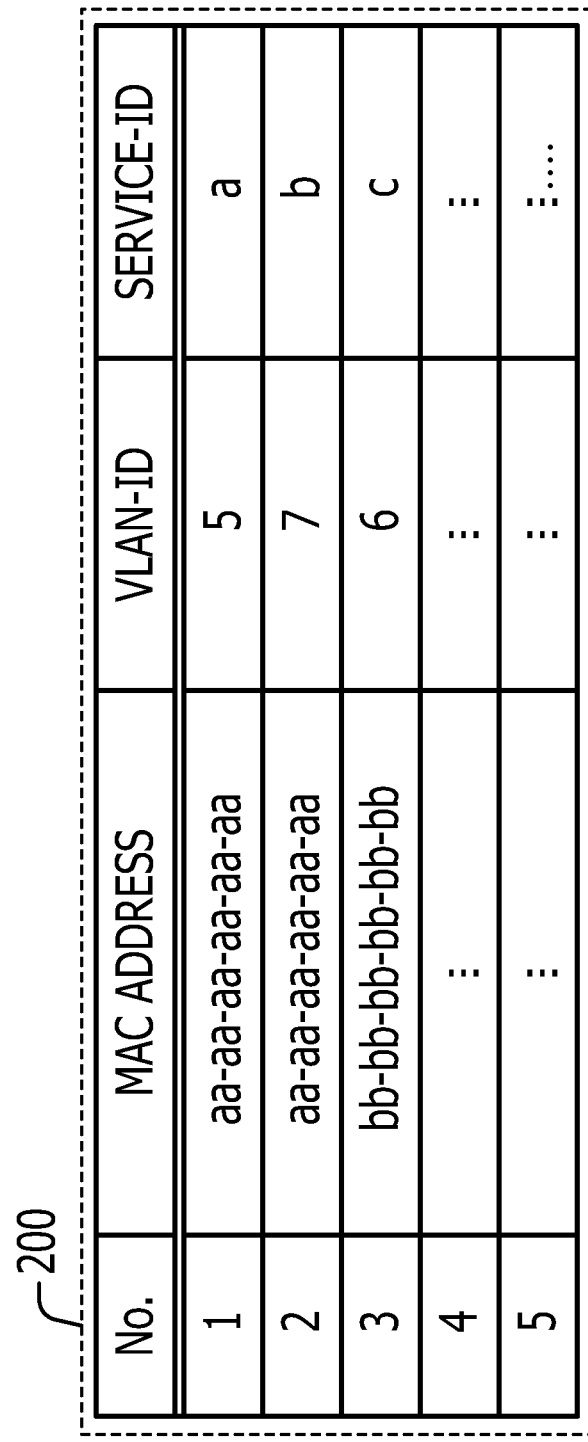
FIG. 2 is a diagram illustrating an example of service-ID associating information, according to an embodiment.

FIG. 2 is a diagram illustrating an example of service-ID associating information, according to an embodiment. In FIG. 2, it is assumed that gateway apparatus 130 includes only one gateway (a communication device) that is belonging to multiple virtual networks, for example, VLANs 105, 106, 107. And, service-ID associating table 200 depicted in FIG. 2 is an example of service-ID associating information that is stored in a communication device that is belonging to three VLANs 105, 106, 107. In service-ID associating table 200, a MAC address assigned to a connection interface of a base station (for example, base station 110), a VLAN-ID, and a service-ID are associated with each other.

As described above, a communication device stores a piece of service-ID associating information (in which a VLAN-ID and a service-ID are associated with each other) for each of connection interface addresses that is assigned to one of connection interfaces of one or more base stations. In the example of FIG. 2, MAC addresses (physical addresses) are depicted as representative examples of connection interface addresses. The communication device, upon receiving a service-ID association request from base station 110, searches service-ID associating table 200 to find one or more pieces of service-ID associating information stored in association with a connection interface address that is equal to a connection request interface address included in the received service-ID association request. Here, the connection request interface address means a connection interface address via which the service-ID association request has been transmitted from the base station. In the example of FIG. 2, it is assumed that VLANs are used as virtual networks, a VLAN frame including a predetermined specified VLAN-ID is used as a service-ID association request, a MAC address is used as a connection interface address, and a source MAC address of the received VLAN frame is used as the connection request interface address. Next, the communication device transmits the one or more pieces of service-ID associating information that have been found to base station 110.

In the case where gateways 131 to 133 are implemented as different communication devices each belonging to a different VLAN, each of gateways 131 to 133 may be configured to include a portion of service-ID associating table 200, that is, to include one or more pieces of service-ID associating information that correspond to the VLAN-ID identifying the VLAN to which the gateway is belonging. For example, gateway 131 may be configured to include a piece of service-ID associating information that correspond to VLAN ID "5", that is, a piece of service-ID associating information assigned No. 1 in which MAC address "aa-aa-aa-aa-aa-aa", VLAN-ID "5", and service-ID "a" are associated with each other.

Each of gateways 131 to 133, upon receiving a VLAN frame including the specified VLAN-ID (a service-ID association request), searches the one or more pieces of service-ID associating information to find at least one piece of service-ID associating information each associated with a source MAC address of the received VLAN frame. When the at least one piece of service-ID associating information has been found, the gateway transmits the at least one piece of service-ID associating information that has been found to base station 110.

Figure 3:
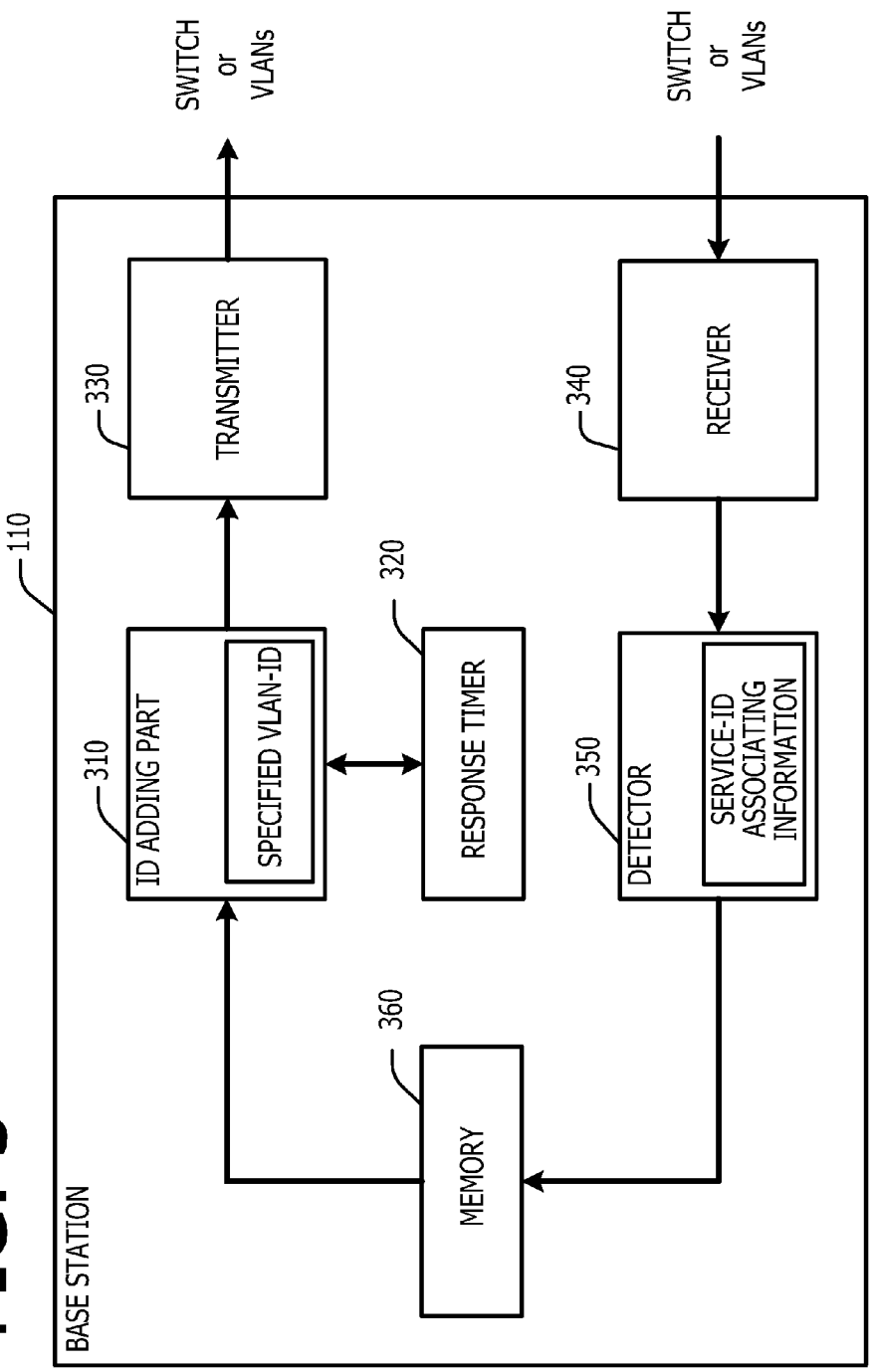
FIG. 3 is a diagram illustrating a configuration example of a base station, according to an embodiment.

FIG. 3 is a diagram illustrating a configuration example of a base station, according to an embodiment. As depicted in FIG. 3, base station 110 may be configured to include, for example, ID adding part 310, response timer 320, transmitter 330, receiver 340, detector 350, and memory 360. ID adding part 310 sets a VLAN-ID to the VLAN tag included in a VLAN frame, and sends to transmitter 330 the VLAN frame in which the VLAN-ID has been set.

For example, under conditions where service-ID associating information has not been stored yet in memory 360, when a service identified by a given service-ID is requested to provide using Ethernet network 101, ID adding part 310 sets a predetermined specified VLAN-ID to the VLAN tag of a VLAN frame to be transmitted. Here, a VLAN-ID that is currently not being used in Ethernet network 101 may be set as the predetermined specified VLAN-ID. In the VLAN frame to which the predetermined specified VLAN-ID has been set, for example, a MAC header may be set such that value "1" is set to all the bits of a destination MAC address field in the MAC header and the MAC address assigned to a connection interface via which the VLAN frame is to be transmitted is set to a source MAC address field in the MAC header.

Meanwhile, under conditions where service-ID associating information has been already stored in memory 360, when a service identified by a given service-ID is requested to provide using Ethernet network 101, ID adding part 310 sends, to transmitter 330, a VLAN frame that is to be used for providing the service. Here, ID adding part 310 determines a VLAN-ID identifying the VLAN that is to be used for providing the service, based on the service-ID associating information stored in memory 360. Then, base station 110 adds the determined VLAN-ID to the VLAN tag of the VLAN frame to be transmitted.

Response timer 320 monitors whether a predetermined time period has elapsed since the base station previously transmitted the VLAN frame including the predetermined specified VLAN-ID that was added by ID adding part 310. When the predetermined time period has elapsed under conditions where service-ID associating information has not been stored yet in memory 360, ID adding part 310 again sends the VLAN frame including the predetermined specified VLAN-ID to transmitter 330. Then, transmitter 330 transmits the VLAN frame received from ID adding part 310, to switch 120 or to Ethernet network 101.

Receiver 340 receives a VLAN frame that has been received from switch 120 or Ethernet network 101. Then, receiver 340 sends the received VLAN frame to detector 350. Detector 350 extracts service-ID associating information from the received VLAN frame that has been sent from receiver 340, and sends the extracted service-ID associating information to memory 360. Memory 360 stores the received service-ID associating information.

Base station 110 transmits a VLAN frame including the predetermined specified VLAN-ID (a service-ID association request) to switch 120 or Ethernet network 101, for example, at the time of establishing a connection with switch 120 or Ethernet network 101. Then, the service-ID association request is received by gateway apparatus 130. This allows base station 110 to acquire service-ID associating information from gateway apparatus 130 and to store the acquired service-ID associating information in memory 360 of base station 110. Thereafter, base station 110 establish a connection with a VLAN that is to be used for providing the service identified by the given service-ID, based on the service-ID associating information stored in memory 360.

Figure 4:
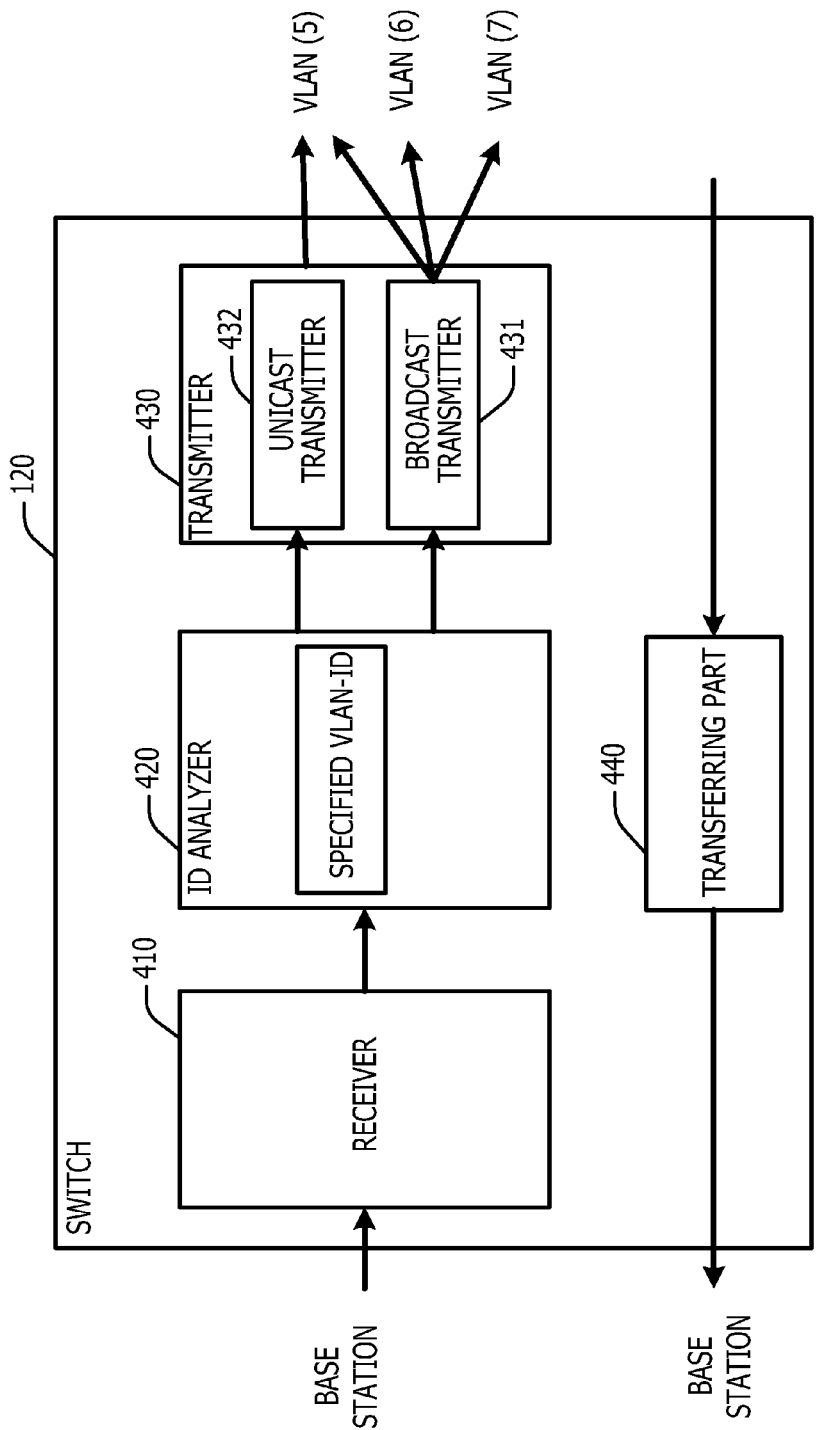
FIG. 4 is a diagram illustrating a configuration example of a switch, according to an embodiment.

FIG. 4 is a diagram illustrating a configuration example of a switch, according to an embodiment. As depicted in FIG. 4, switch 120 may be configured to include, for example, receiver 410, ID analyzer 420, transmitter 430, and transferring part 440. Receiver 410 receives a VLAN frame from base station 110, and determines whether the received VLAN frame is valid or not. When it is determined that the received VLAN frame is not valid, the received VLAN frame may be discarded. When it is determined that the received VLAN frame is valid, receiver 410 sends the received VLAN frame to ID analyzer 420.

ID analyzer 420 analyzes the VLAN-ID included in the VLAN frame that has been sent from receiver 410. When the VLAN-ID included in the received VLAN frame is the predetermined specified VLAN-ID, ID analyzer 420 determines that the received VLAN frame is a service-ID association request for acquiring service-ID associating information from a communication device, and sends the received VLAN frame (the service-ID association request) to broadcast transmitter 431 of transmitter 430. When the VLAN-ID included in the received VLAN frame is not the predetermined specified VLAN-ID, ID analyzer 420 determines that the received VLAN frame is not a service-ID association request but a normal VLAN frame for providing the service identified by the given service-ID, and sends the received VLAN frame (the normal VLAN frame) to unicast transmitter 432 of transmitter 430.

Transmitter 430 may be configured to include broadcast transmitter 431 and unicast transmitter 432. Broadcast transmitter 431 broadcasts a service-ID association request (a VLAN frame including the predetermined specified VLAN-ID) received from ID analyzer 420 to all the VLANs 105 to 107. Unicast transmitter 432 transmits a normal VLAN frame received from ID analyzer 420, to one of VLANs 105 to 107 which is identified by the VLAN-ID included in the received normal VLAN frame.

Transferring part 440 transfers, to base station 110, a VLAN frame that includes service-ID associating information and has been transmitted from gateway apparatus 130. In this way, upon receiving a service-ID association request, for example, a VLAN frame including the predetermined specified VLAN-ID, from base station 110, switch 120 broadcasts the received service-ID association request (the VLAN frame) to all the VLANs 105 to 107 so that service-ID associating information is transmitted from gateway apparatus 130 to base station 110 in response to the broadcasted VLAN frame. This allows base station 110 to acquire the service-ID associating information that is needed to providing a service identified by the given service-ID.

Figure 5:
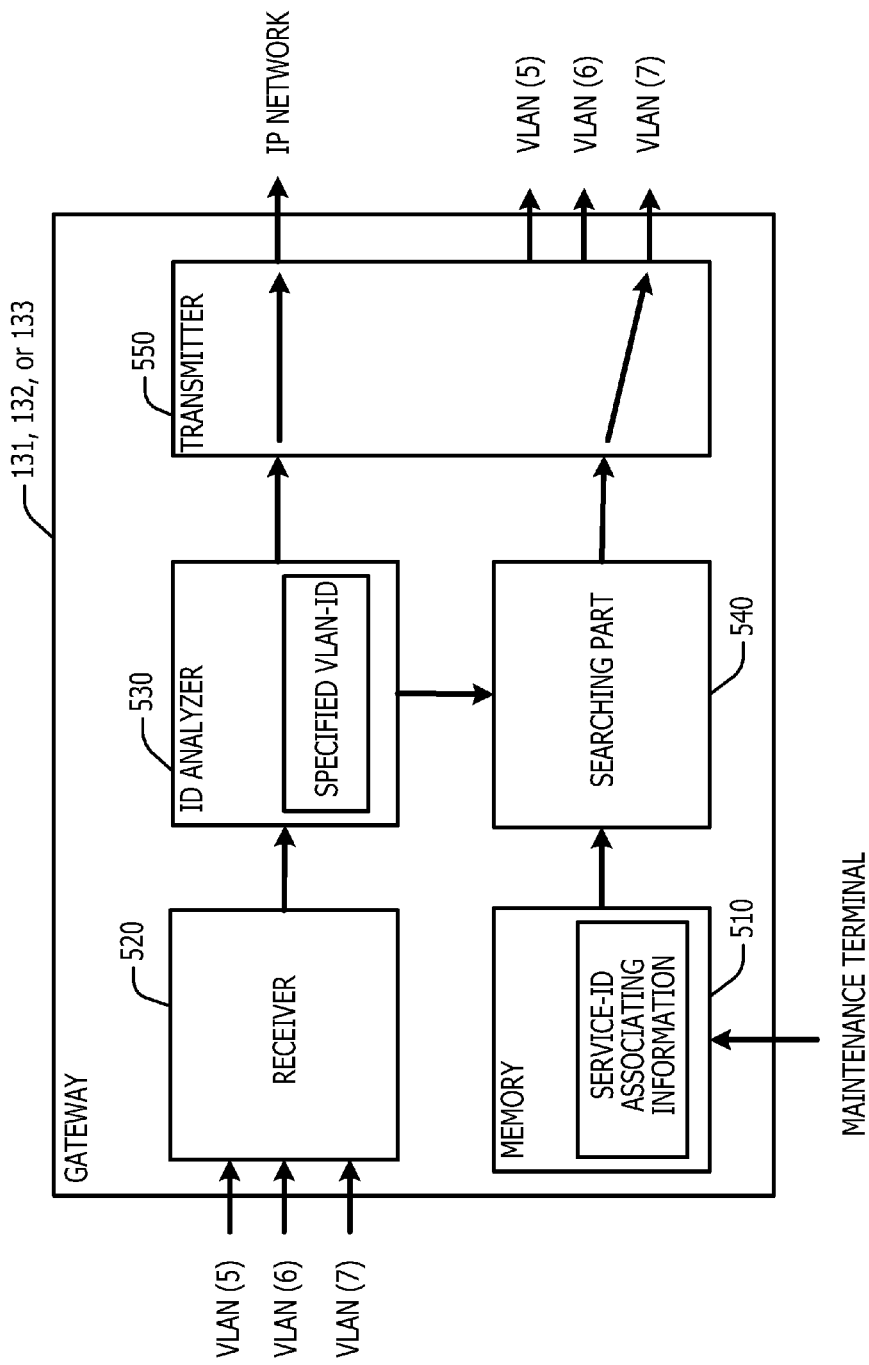
FIG. 5 is a diagram illustrating a configuration example of a communication device, according to an embodiment.

FIG. 5 is a diagram illustrating a configuration example of a communication device, according to an embodiment. In the example of FIG. 5, a configuration of one of gateways 131, 132, 133 of FIG. 1 is depicted as a representative example of a communication device according to an embodiment. As depicted in FIG. 5, each of gateways 131 to 133 may be configured to include, for example, memory 510, receiver 520, ID analyzer 530, searching part 540, and transmitter 550. In memory 510, service-ID associating information may be set beforehand, for example, by using maintenance terminal 140. Receiver 520 receives a VLAN frame that has been transmitted from switch 120 or Ethernet network 101 via one of VLANs 105 to 107, and sends the received VLAN frame to ID analyzer 530.

ID analyzer 530 analyzes a VLAN-ID included in the VLAN frame received from receiver 520. When the received VLAN frame includes a predetermined specified VLAN-ID, ID analyzer 530 determines that the received VLAN frame is a service-ID association request, and sends the received VLAN frame (the service-ID association request) to searching part 540.

Meanwhile, when the received VLAN frame does not include a predetermined specified VLAN-ID, ID analyzer 530 determines that the received VLAN frame is a normal VLAN frame, and sends the received VLAN frame to a VLAN frame processing part (not depicted in FIG. 5) when the received VLAN frame is destined for the gateway. Further, when the received VLAN frame does not include the predetermined specified VLAN-ID and is destined for IP network 102, ID analyzer 530 sends the received VLAN frame, as a normal VLAN frame, to transmitter 550.

Searching part 540 searches memory 510 to find one or more pieces of service-ID associating information that are associated with the same MAC address as a source MAC address included in the VLAN frame received from ID analyzer 530 (the service-ID association request). When there exist the one or more pieces of service-ID associating information stored in memory 510, searching part 540 sends, to transmitter 550, a VLAN frame that is destined for base station 110 and includes the one or more pieces of service-ID associating information that were found in memory 510. Here, when there exist no pieces of service-ID associating information stored in memory 510, searching part 540 does not send any VLAN frames to transmitter 550.

Upon receiving a VLAN frame from ID analyzer 530, transmitter 550 transmits the received VLAN frame to IP network 102. Meanwhile, upon receiving a VLAN frame from searching part 540, transmitter 550 transmits the received VLAN frame to at least one of the plurality virtual networks, for example, VLANs 105 to 107. For example, transmitter 550 transmits a VLAN frame received from searching part 540, to a VLAN via which receiver 520 has received the service-ID association request (the VLAN frame including the predetermined VLAN-ID), for example, to VLAN 107. In this case, the VLAN frame that has been transmitted to VLAN 107 is received by base station 110 so that the service-ID associating information contained in the received VLAN frame is stored in memory 360 of base station 110.

As described above, service-ID associating information, in which a service-ID identifying each of one or more services to be provided is stored in association with at least one virtual network identifier each identifying a virtual network that is included in the plurality of virtual networks and is to be used for providing the each of the one or more services, may be stored beforehand in each of gateways 131 to 133, that is, in a communication device according to an embodiment. Then, upon receiving a service-ID association request (for example, a VLAN frame including a predetermined specified VLAN-ID) from base station 110, a communication device (for example, a gateway) transmits the stored service-ID associating information to base station 110 so that base station 110 holds the service-ID associating information that is needed for establishing a connection with a virtual network to be used for providing a service identified by a given service-ID.

Figure 6:
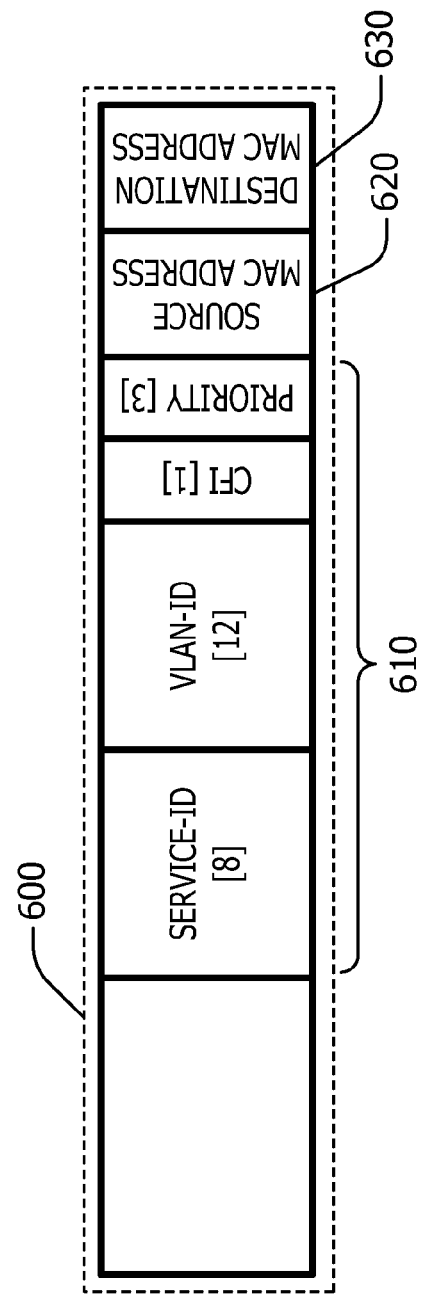
FIG. 6 is a diagram illustrating an example of a VLAN frame including a piece of service-ID associating information, according to an embodiment.

FIG. 6 is a diagram illustrating an example of a VLAN frame including service-ID associating information, according to an embodiment. In FIG. 6, VLAN frame format 600 indicates an example of a VLAN frame that is transmitted from a communication device (for example, a gateway) to base station 110, and includes a piece of service-ID associating information. VLAN frame format 600 may be configured to, for example, include VLAN tag 610, source MAC address 620, and destination MAC address 630.

Here, VLAN tag 610 may be configured to include, for example, a service-ID field (8 bits), a VLAN-ID field (12 bits), a CFI field (1 bit), and a priority field (3 bits). The CFI (Canonical Format Identifier) field stores information specifying a notation system for a MAC address. The priority field indicates a priority of a VLAN frame. Source MAC address 620 indicates the MAC address of a communication device from which the VLAN frame has transmitted. Destination MAC address 630 indicates the MAC address of base station 110 to which the VLAN frame is to be transmitted. In the example of FIG. 6, service-ID associating information stored in a communication device is transmitted from the communication device to a base station so that only one piece of service-ID associating information is transmitted using one VLAN frame. However, it may be possible to transmit multiple pieces of service-ID associating information at once using one VLAN frame.

Figure 7:
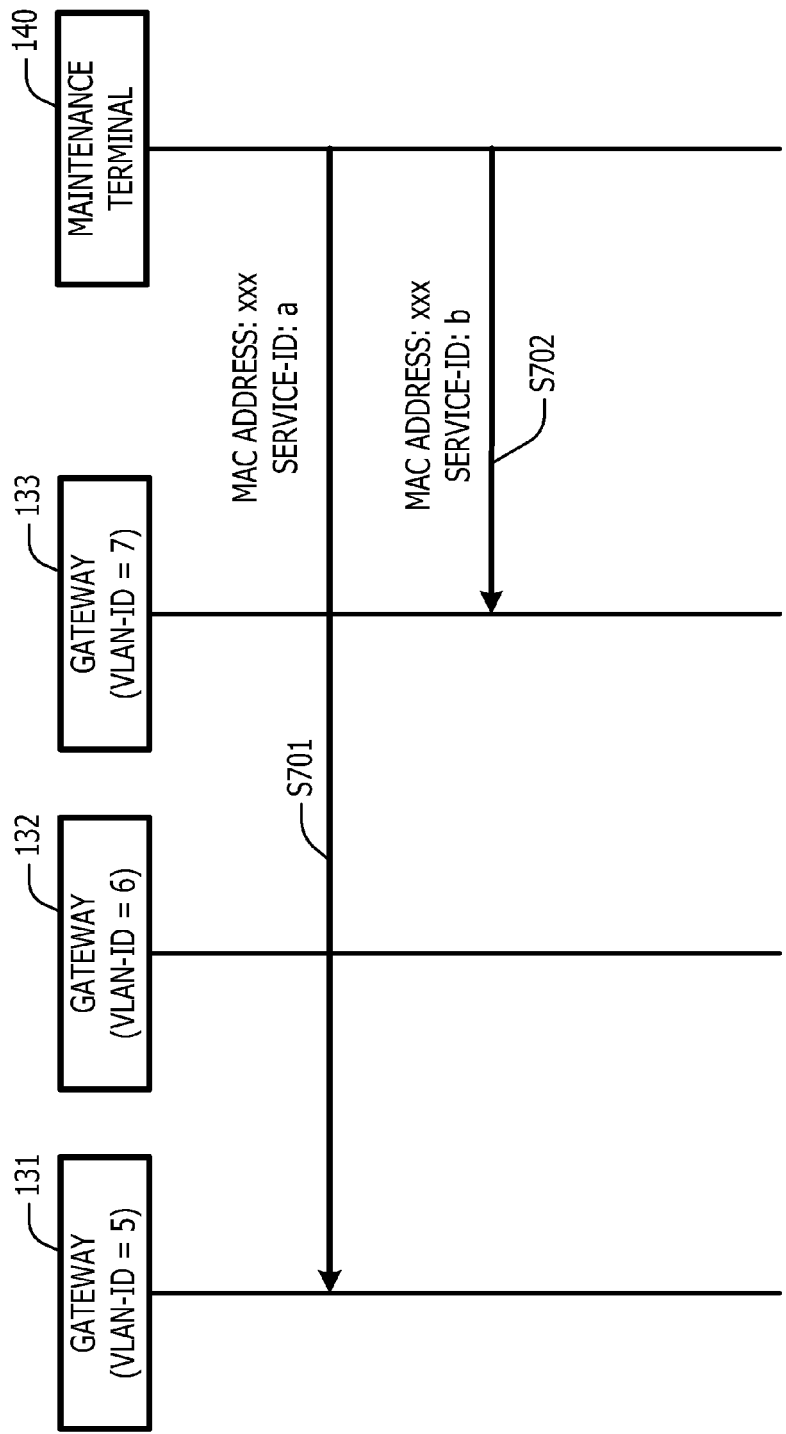
FIG. 7 is a diagram illustrating an example of an operational sequence for setting service-ID associating information to a communication device, according to an embodiment.

FIG. 7 is a diagram illustrating an example of an operational sequence for setting service-ID associating information to a communication device, according to an embodiment. In FIG. 7, a MAC address assigned to a connection interface of base station 110 is denoted by "xxx". First, maintenance terminal 140 requests gateway 131 (belonging to a VLAN identified by VLAN-ID "5") to register service-ID "a" in association with MAC address "xxx" assigned to the connection interface of base station 110. Then, gateway 131 stores service-ID "a" in association with VLAN-ID "5" and MAC address "xxx", as a first piece of service-ID associating information (in operation S701).

Next, maintenance terminal 140 requests gateway 133 (belonging to a VLAN identified by VLAN-ID "7") to register service-ID "b" in association with MAC address "xxx" assigned to the connection interface of base station 110, and gateway 131 stores service ID "b" in association with VLAN-ID "7" and MAC address "xxx", as a second piece of service-ID associating information (in operation S702). Then, the operational sequence for setting service-ID associating information is terminated.

As mentioned above, for each of services to be provided, a service-ID assigned thereto is registered in association with MAC address "xxx" assigned to a connection interface of base station 110 and a VLAN-ID identifying a VLAN via which base station 110 provides the service identified by the service-ID. In the example depicted in FIG. 7, it is assumed that service-ID associating information is not set to gateway 132 by maintenance terminal 140.

In the above case, it was assumed that single MAC address "xxx" is assigned to a connection interface of base station 110. However, base station 110 may be configured to include multiple connection interfaces to which multiple MAC addresses is assigned. For example, base station 110 may be configured to include a first connection interface and a second connection interface to which MAC addresses "xxx" and "yyy" are assigned, respectively. In this case, an operational sequence for setting service-ID associating information a gateway apparatus may be configured such that service-ID "a" is registered, in gateway 131, in association with MAC address "xxx" assigned to the first connection interface of base station 110 (in operation S701), and service-ID "b" is registered, in gateway 133, in association with MAC address "yyy" assigned to the second connection interface of base station 110 in gateway 133 (in operation S802).

Figure 8:
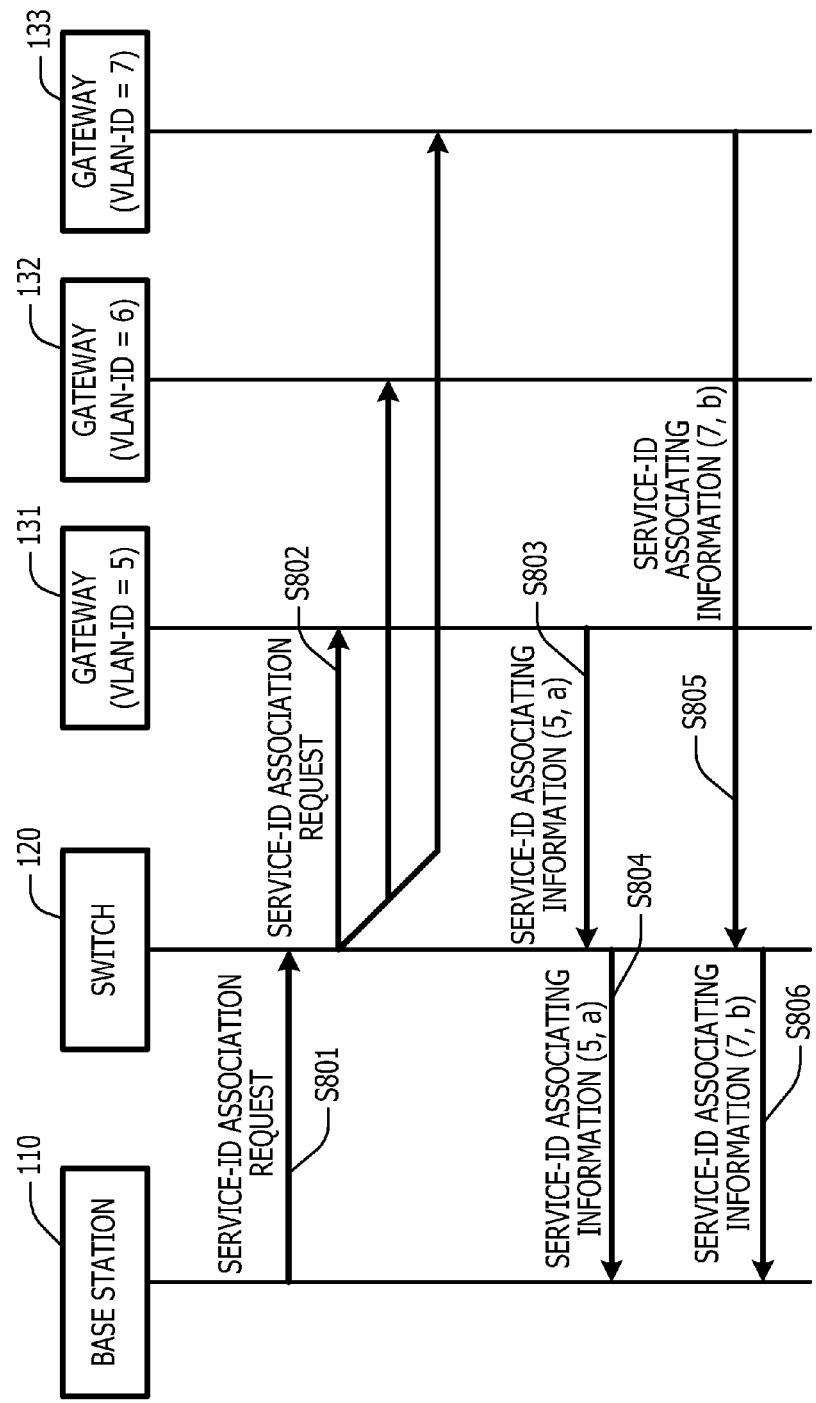
FIG. 8 is a diagram illustrating an example of an operational sequence for setting service-ID associating information to a base station, according to an embodiment.

FIG. 8 is a diagram illustrating an example of an operational sequence for setting service-ID associating information to a base station, according to an embodiment. When base station 110 establishes a connection with switch 120 after completion of the operational sequence depicted in FIG. 7, for example, the following operations may be performed.

In operation S801, base station 110 sends to switch 120, as a service-ID association request, a VLAN frame in which a predetermined specified VLAN-ID is set to the VLAN tag and MAC address "xxx" is set as a source MAC address.

In operation S802, switch 120 transmits the VLAN frame received in operation S801 (the service-ID association request) to gateways 131 to 133.

In operation S803, gateway 131 search memory 510 thereof to find one or more pieces of service-ID associating information that are stored in association with the same MAC address as a source MAC address "xxx" of the VLAN frame received in operation S802 (the service-ID association request). In this case, for example, the first piece of service-ID associating information associating service-ID "a" with VLAN-ID "5", which was set in operation S701 of FIG. 7, is found. Gateway 131 transmits, to switch 120, a VLAN frame including destination MAC address "xxx" and the first piece of service-ID associating information that was found in memory 510 of gateway 131.

In operation S804, switch 120 transfers, to base station 110 (having a connection interface assigned MAC address "xxx"), the VLAN frame including the first piece of service-ID associating information that was received in operation S803 and associates service-ID "a" with VLAN-ID "5". This allows base station 110 to recognize that base station 110 should establish a connection with VLAN 105 identified by VLAN-ID "5" when providing a service identified by service-ID "a".

In operation S805, gateway 133 search memory 510 thereof to find one or more pieces of service-ID association information that are stored in association with the same MAC address as source MAC address "xxx" of the VLAN frame received in operation S802. In this case, for example, the second piece of service-ID association information associating service-ID "b" with VLAN-ID "7", which was set in operation S702 of FIG. 7, is found. Then gateway 133 transmits, to switch 120, the second piece of service-ID association information that was found in memory 510 of gateway 133.

In operation S806, switch 120 transfers, to base station 110 (having MAC address "xxx"), the VLAN frame containing the second piece of service-ID associating information that was received in operation S805 and is associating service-ID "a" with VLAN ID "5". Next, base station 110 stores the received second piece of service-ID association information in memory 360 thereof. This allows the base station 110 to recognize that the base station 110 should establish a connection with VLAN 107 identified by VLAN-ID "7" when providing a service identified by service-ID "b". Then, the operational sequence for setting service-ID associating information to base station 110 is terminated.

The above described operational sequence allows base station 110 to select, from a plurality of VLANs, a VLAN to be used for providing each of services in Ethernet network 101, and to establish a connection with the selected VLAN. In the above mentioned example depicted in FIG. 8, since any pieces of service-ID associating information associated with source MAC address "xxx" of the VLAN frame transmitted in operation S802 is not registered beforehand in gateway 132 (as depicted in FIG. 7), gateway 132 does not transmit any pieces of service-ID association information to switch 120 even when receiving a service-ID association request including, as a connection request interface address, a MAC address "xxx", for example, a VLAN frame including source MAC address "xxx" and the predetermined specified VLAN-ID.

Figure 9:
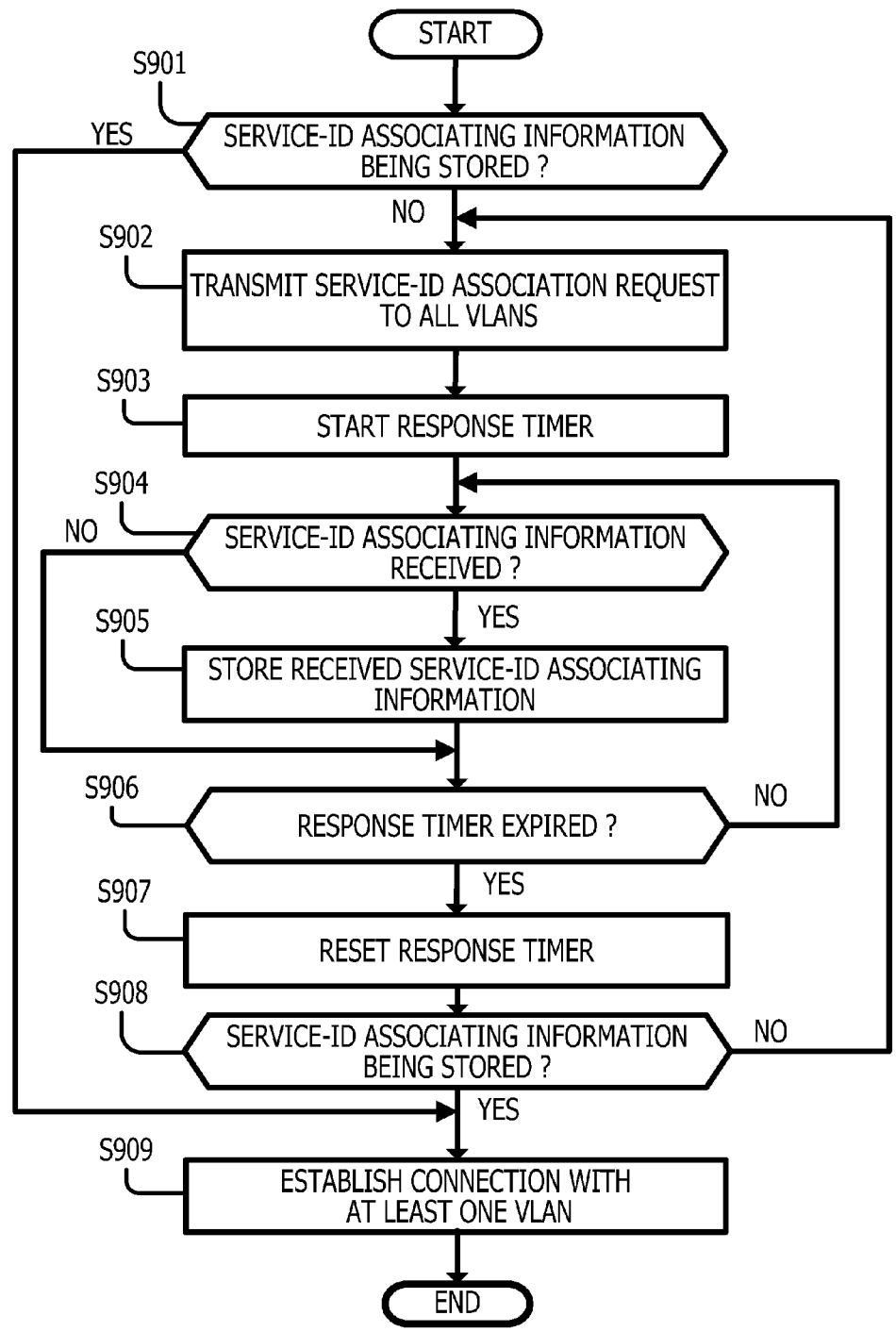
FIG. 9 is a diagram illustrating an example of an operational flowchart performed by a base station, according to an embodiment.

FIG. 9 is a diagram illustrating an example of an operational flowchart performed by a base station, according to an embodiment. Base station 110 performs the following operations, for example, at the time of establishing a connection with switch 120 or Ethernet network 101.

In operation S901, base station 110 determines whether service-ID associating information is being stored in memory 360 thereof or not. When the service-ID associating information is being stored in memory 360 (YES in operation S901), base station 110 shifts to operation S909. When the service-ID associating information is not being stored in memory 360 (NO in operation S901), base station 110 transmits (broadcasts) a service-ID association request, for example, a VLAN frame including a predetermined specified VLAN-ID, to a plurality of VLANs (in operation S902) via switch 120 or Ethernet network 101.

Next, base station 110 starts a response timer that is configured to expire after detecting elapse of a predetermined time period (in operation S903).

In operation S904, base station 110 determines whether service-ID associating information has been received or not. When the service-ID associating information has not been received yet (NO in operation S904), base station 110 shifts to operation S906. When the service-ID associating information has been already received (YES in operation S904), base station 110 stores the received service-ID associating information in memory 360 thereof.

In operation S906, base station 110 determines whether the response timer has expired or not. When the response timer has not expired yet (NO in operation S906), base station 110 returns to operation S904. When the response timer has expired (YES in operation S906), base station 110 resets the response timer (in operation S907).

In operation S908, base station 110 determines whether service-ID associating information is being stored in memory 360 thereof or not. When service-ID associating information is not being stored in memory 360 (NO in operation S908), base station 110 returns to operation S902 so as to retransmit the service-ID association request. When the service-ID associating information is being stored in memory 360 (YES in operation S908), base station 110 selects, from the plurality of VLANs, a VLAN to be used for providing a service identified by a given service-ID, based on the service-ID associating information stored in memory 360 thereof, and establishes a connection with the selected VLAN (in operation S909). Then base station 110 terminates the operational sequence.

As mentioned above, when service-ID associating information has not been stored yet in memory 360, base station 110 transmits (broadcasts), to a plurality of VLANs, a service-ID association request, for example, a VLAN frame having a VLAN tag containing the predetermined specified VLAN-ID, and receives service-ID associating information from a communication device (for example, a gateway) in response to the transmitted service-ID association request. In this way, base station 110 may be configured to select a VLAN-ID identifying a VLAN to be used for providing a service in Ethernet network 101, and to establish a connection with the VLAN identified by the selected VLAN-ID.

Further, base station 110 may be configured to retransmit a service-ID association request when service-ID associating information has not been received for a predetermined time period after previously transmitting the service-ID association request.

Figure 10:
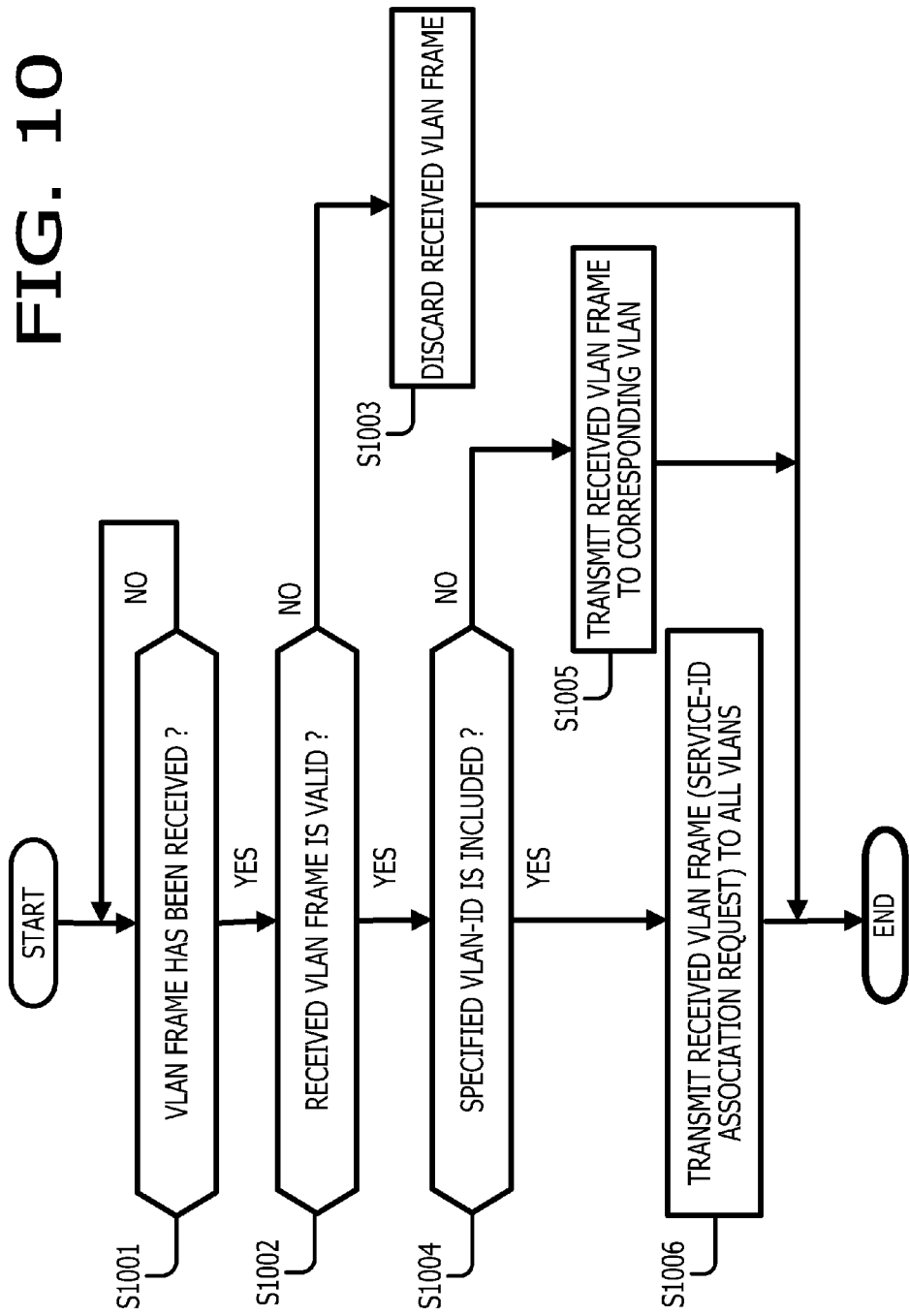
FIG. 10 is a diagram illustrating an example of an operational flowchart performed by a switch, according to an embodiment.

FIG. 10 is a diagram illustrating an example of an operational flowchart performed by a switch, according to an embodiment. For example, switch 120 performs the following sequence of operations.

In operation S1001, switch 120 determines whether a VLAN frame has been received from base station 110 or not, and waits for a reception of a VLAN frame when it is determined that a VLAN frame has not been received from base station 110 (NO in operation S1001). When a VLAN frame has been received (YES in operation S1001), switch 120 further determines whether the received VLAN frame is valid or not (in operation S1002).

When it is determined that the received VLAN frame is not valid (NO in operation S1002), switch 120 discards the received VLAN frame (in operation S1003), and terminates the sequence of operations. Meanwhile, when it is determined that the received VLAN frame is valid (YES in operation S1002), switch 120 further determines whether a VLAN-ID included in the received VLAN frame is a predetermined specified VLAN-ID or not (in operation S1004).

When it is determined that the VLAN-ID is not the predetermined specified VLAN-ID (NO in operation S1004), the received VLAN frame is determined to be a normal VLAN frame. Therefore, switch 120 transmits the received VLAN frame, as a normal VLAN frame, to a VLAN identified by the VLAN-ID, by outputting the received VLAN frame to a communication port corresponding to the VLAN identified by the VLAN-ID (in operation S1005), and terminates the sequence of operations. In this way, a normal VLAN frame received from base station 110 is transferred to a VLAN identified by the VLAN-ID included in the received VLAN frame.

Meanwhile, when the VLAN-ID is the predetermined specified VLAN-ID (YES in operation S1004), the received VLAN frame is determined to be a service-ID association request. Therefore, switch 120 transmits the received VLAN frame, as a service-ID association request, to communication ports corresponding to all the plurality of VLANs (in operation S1006), and terminates the sequence of operations. As mentioned above, upon receiving a service-ID association request (for example, a VLAN frame including the predetermined specific VLAN-ID) from base station 110, switch 120 transmits, as a service-ID association request, the received VLAN frame to each of the plurality of VLANs 105 to 107.

Figure 11:
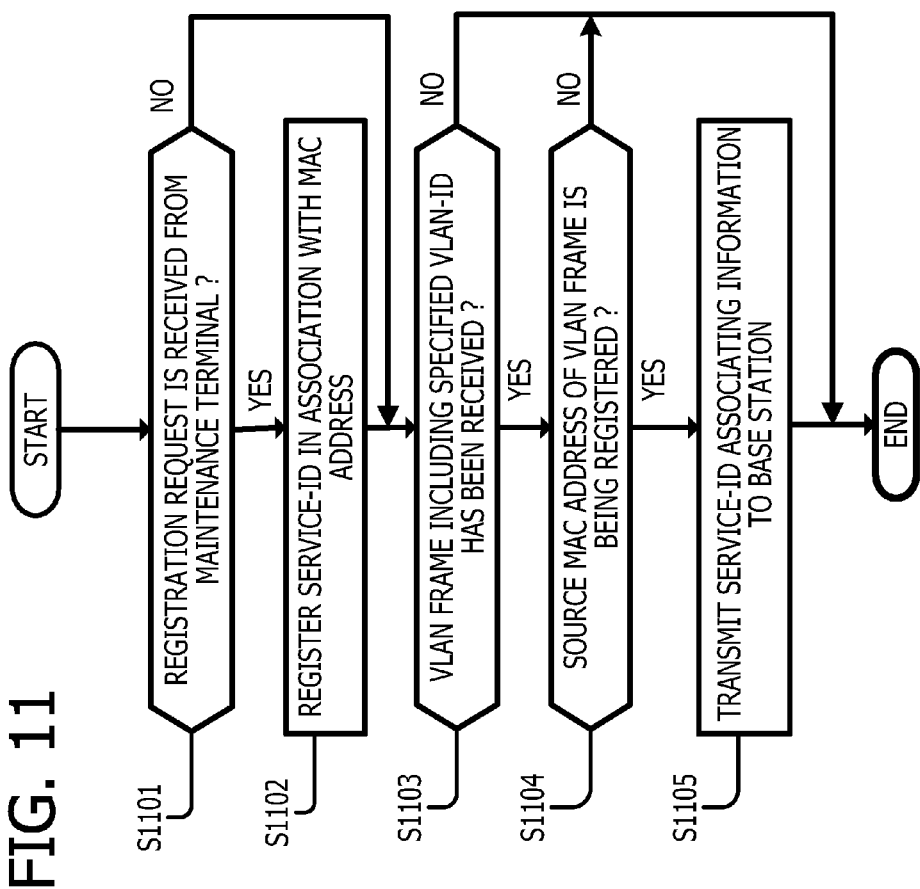
FIG. 11 is a diagram illustrating an example of an operational flowchart performed by a communication device, according to an embodiment.

FIG. 11 is a diagram illustrating an example of an operational flowchart performed by a communication device, according to an embodiment. In the example of FIG. 11, a gateway is used as a representative example of a communication device according to an embodiment. A gateway, which is one of gateways 131 to 133 included in gateway apparatus 130, may be configured to perform, for example, the following sequence of operations. First, the gateway determines whether a registration request for setting service-ID associating information has been received from maintenance terminal 140 or not (in operation S1101). When the registration request has not been received yet (NO in operation S1101), the gateway shifts to operation S1103. When the registration request has been received (YES in operation S1101), the gateway sets a piece of service-ID associating information in which a service-ID is stored in association with a VLAN-ID identifying a VLAN to which the gateway is belonging and the MAC address assigned to a connection interface via which base station 110 provides a service identified by the service-ID, based on the registration request received from maintenance terminal 140 (in operation S1102).

Next, the gateway determines whether a service-ID association request (for example, a VLAN frame including a VLAN tag containing a predetermined specified VLAN-ID) has been received or not (in operation S1103). When the service-ID association request has not been received yet (NO in operation S1103), the gateway terminates the sequence of operations. When the service-ID association request has been received (YES in operation S1103), the gateway further determines whether the source MAC address of the received VLAN frame matches one of MAC addresses registered in operation S1102 or not (in operation S1104).

When the source MAC address of the received VLAN frame does not match any one of the MAC addresses registered in operation S1102 (NO in operation S1104), the gateway terminate the sequence of operations. When the source MAC address of the received VLAN frame matches one of the MAC addresses registered in operation S1102 (YES in operation S1104), the gateway transmits, to base station 110, one or more pieces of service-ID associating information each being registered in operation S1102 and including a VLAN-ID and a service-ID in association with the matched MAC address (in operation S1105). Then, the gateway terminates the sequence of operations. Here, a destination address of a VLAN frame including each of the one or more pieces of service-ID associating information that is transmitted in operation S1105, is a MAC address assigned to a connection interface via which the service-ID association request has been transmitted from base station destination 110.

As mentioned above, in each of gateways 131 to 133, a service-ID is registered in association with a VLAN-ID, for each MAC address assigned to a connection interface via which the base station establish a connection with a VLAN identified by the VLAN-ID so as to provide a service identified by the service-ID. Each of gateways 131 to 133, upon receiving a service-ID association request (for example, a VLAN frame including a predetermined specified VLAN-ID), transmits, to a connection interface of base station 110, one or more pieces of service-ID associating information storing a VLAN-ID and a service-ID that have been registered in association with the MAC address assigned to the connection interface of base station 110.

Figure 12:
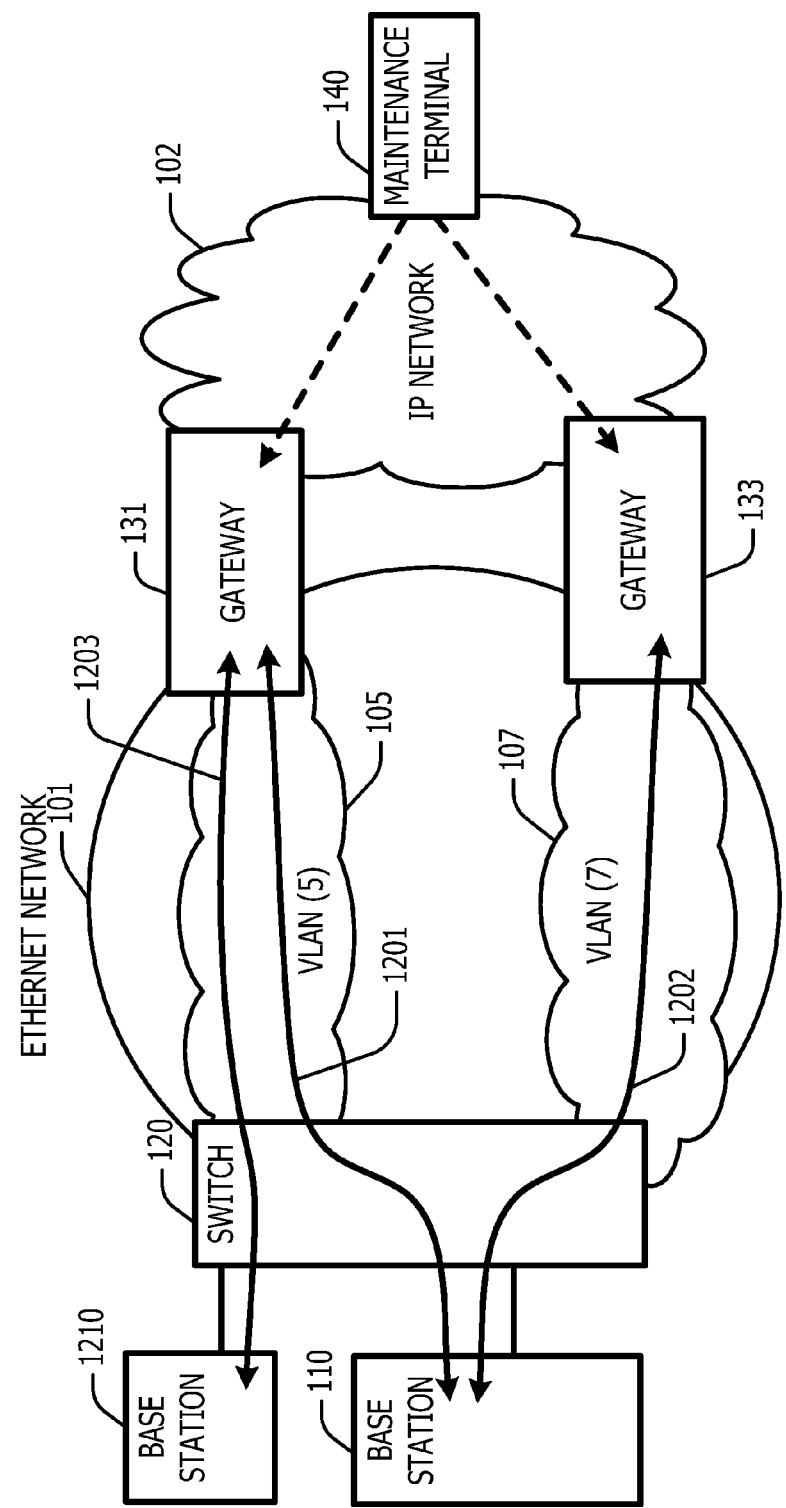
FIG. 12 is a diagram illustrating an example of a connection method for connecting a base station to a virtual network, according to an embodiment.

FIG. 12 is a diagram illustrating an example of a connection method for connecting a base station to a virtual network, according to an embodiment. In FIG. 12, base station 110 receives first service-ID associating information that has been transmitted from gateways 131, 133, and establishes a connection with a virtual network (a VLAN) to be used for providing each of services, based on the received first service-ID associating information. For example, as depicted by arrowed line 1201, base station 110 establishes a connection with VLAN 105 when providing a service identified by service-ID "a". Further, as depicted by arrowed line 1202, base station 110 establishes a connection with VLAN 107 when providing a service identified by service-ID "b".

Further, it is also possible to establish a connection from base station 1210 different from base station 110 to Ethernet network 101. Here, it is assumed that second service-ID associating information storing service-ID "a" and VLAN-ID "5" in association with the MAC address assigned to a connection interface of base station 1210 is registered in gateway 131. In this case, base station 1210 receives the second service-ID associating information that has been transmitted from gateway 131, and establishes a connection with a VLAN to be used for providing each of services, based on the received second service-ID associating information. For example, as depicted by arrowed line 1203, base station 1210 establishes a connection with VLAN 105 when providing a service identified by service-ID "a".

As mentioned above, in communication system 100 according to an embodiment, service-ID associating information, in which a service-ID identifying each of one or more services to be provided is stored in association with at least one virtual network identifier each identifying a virtual network that is included in the plurality of virtual networks and is to be used for providing the each of the one or more services, is stored beforehand in a communication device such as each of gateways 131 to 133. Upon receiving a service-ID association request from base station 110, the communication device transmits service-ID associating information that is being stored in the communication device, to base station 110. This allows base station 110 to easily select, from among a plurality of VLANs, a VLAN to be used for providing each of services in Ethernet network 101 and to establish a connection with the selected VLAN.

For example, in the case of installing base station 110, base station 110 may be configured to automatically establishing a connection with a plurality of VLANs 105 to 107 or IP network 102, and to automatically set various pieces of data (for example, an IP address) to base station 110, without setting the various pieces of data to base station 110 by connecting a terminal such as maintenance terminal 140 with base station 110. This may facilitate operations required for installing base station 110.

Further, for example, base station 110 may be configured to connect with Ethernet network 101 via switch 120 that is provided for Ethernet network 101. According to this configuration, a service-ID association request, such as a VLAN frame including a predetermined specified VLAN-ID, may be transmitted to a plurality of VLANs 105 to 107 such that base station 110 requests switch 120 to transfer the service-ID association request that has been transmitted from base station 110, to all the plurality of VLANs 105 to 107.

For example, base station 110 transmits, as a service-ID association request, a VLAN frame including a predetermined specified VLAN-ID to switch 120. Upon receiving the VLAN frame, switch 120 transfers the received VLAN frame to VLANs 105 to 107 when the received VLAN frame includes the predetermined specified VLAN-ID. In this way, the VLAN frame including the predetermined specified VLAN-ID may be transmitted to a plurality of VLANs 105 to 107. Further, switch 120 may be configured to transfer service-ID associating information that has been transmitted from gateway apparatus 130, to base station 110.

Further, base station 110 may be configured to transmit, to a communication device (for example, a gateway), as a service-ID association request, a first VLAN frame that includes a predetermined specified VLAN-ID and includes, as a source MAC address of the first VLAN frame, a MAC address assigned to a connection interface of base station. Upon receiving the first VLAN frame, the communication device transmits, to base station 110, via at least one of the plurality of VLANs 105 to 107, a second VLAN frame that includes service-ID associating information and includes, as a destination MAC address of the second VLAN frame, the MAC address assigned to the connection interface of the base station 110. In this way, service-ID associating information may be transmitted from the communication device (for example, the gateway) to base station 110.

Further, a communication device may be configured to store service-ID associating information in association with a MAC address assigned to each of connection interfaces of multiple base stations. Upon receiving a first VLAN frame including the predetermined specified VLAN-ID (a service-ID association request), the communication device transmits one or more pieces of service-ID associating information that are stored in association with the same MAC address as the source MAC address of the received first VLAN frame, to one of the multiple base stations that has the same MAC address as the source MAC address of the received first VLAN frame. This allows setting a VLAN to be used for providing each of services, to each of the multiple base stations.

Base station 110 may be configured to transmit, as a service-ID association request, a VLAN frame including a predetermined specified VLAN-ID, to a plurality of VLANs at the time of establishing a connection with Ethernet network 101. This allows base station 110 to acquire service-ID associating information when connecting with Ethernet network 101, thereby enabling automatic startup of base station 110 using a plug-in method.

Here, a trigger for base station 110 to transmit a service-ID association request is not limited to the timing of establishing a connection with Ethernet network 101. For example, base station 110 may be configured to transmit the service-ID association request when base station 110 is invoked, or when a command is inputted by a user. This allows base station 110 to acquire service-ID associating information either when base station 110 is invoked, or when the command is inputted by the user. In this way, communication system 100 may be configured to have flexibility in setting of a VLAN that is to be used for providing a service.

Further, setting of service-ID associating information may be facilitated by using, as a communication device for storing service-ID associating information, a gateway that is arranged between at least one of a plurality of VLANs 105 to 107 and another network (for example, IP network 102). This allows, for example, service-ID associating information to be set to the communication device via IP network 102 using maintenance terminal 140. It is also possible to use, as a communication device for storing service-ID associating information, a device other than the gateway that is arranged between the plurality of VLANs 105 to 107 and another network.

Further, base station 110 may be configured to retransmit a service-ID association request (for example, a VLAN frame including a predetermined specified VLAN-ID) when base station 110 has failed to receive service-ID associating information for a predetermined time period after previously transmitting the service-ID association request. This allows base station 110 to retransmit a service-ID association request, for example, when a communication device has failed to receive the service-ID association request due to a fault occurrence during transmission of the service-ID association request, or when base station 110 has failed to receive service-ID associating information due to a fault occurrence during transmission of the service-ID associating information. This allows base station 110 to acquire more reliably service-ID associating information.

In the above description, although Ethernet network 101 was described as a representative example of a communication network including a plurality of virtual communication networks, transmission technology that is to be used for a communication network including a plurality of virtual communication networks is not limited to Ethernet. Further, in the above description, although description was given of a configuration example in which gateways 131 to 133 are included in the same gateway apparatus 130, each of gateways 131 to 133 may be configured as a different communication device.

Further, although base station 110 was connected to Ethernet network 101 via switch 120 in the above description, base station 110 may be configure to connect directly with Ethernet network 101. In this case, base station 110 may be configured to transmit, as a service-ID association request, a VLAN frame including a predetermined specific VLAN-ID to all the VLANs 105 to 107 using a broadcast communication method.

In the above description, although a VLAN frame including a predetermined specified VLAN-ID was described as a representative example of a service-ID association request, the configuration of the service-ID association request is not limited to the VLAN frame including the predetermined specified VLAN-ID. For example, it is also possible to define a new message in communication system 100 such that base station 110 transmit the newly defined message as a service-ID association request.

As mentioned above, a communication system according to the embodiments described abode, allows a base station to easily establish a connection with each of a plurality of virtual networks that is to be used for providing a service.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the scope of the invention.

What is claimed is:

1. A communication system for establishing a connection between a base station and a plurality of virtual LANs (VLANs) provisioned in an Ethernet network, comprising:

a plurality of gateways each belonging to a different one of the plurality of VLANs and connecting the one of the plurality of VLANs with another network, and configured to include service-ID associating information in which a service-ID identifying each of one or more services to be provided is stored in association with a VLAN identifier identifying a VLAN to be used for providing the each of the one or more services;

a base station configured to connect with the Ethernet network; and a switch configured to:
  connect with the base station, and
  connect with each of the plurality of gateways through a VLAN to which the each gateway belongs, wherein the switch, upon receiving from the base station a first VLAN frame including a predetermined VLAN-ID that is to be set to a VLAN tag of a VLAN frame and is not assigned to any one of the plurality of VLANs, broadcasts the first VLAN frame including the predetermined VLAN-ID to all the plurality of gateways via the plurality of VLANs before establishing connections with the plurality of VLANs;

each gateway, upon receiving the first VLAN frame including the predetermined VLAN-ID from the switch through a VLAN to which the each gateway belongs, transmits the service-ID associating information stored in the each gateway to the switch, the switch, upon receiving the service-ID associating information from each gateway, transfers the received service-ID associating information to the base station, the base station stores the received service-ID associating information in a memory thereof, and the base station, for a given service-ID identifying a service to be provided, selects, from among the plurality of VLANs, at least one VLAN that is associated with the given service-ID by the service-ID associating information stored in the memory, and establishes a connection with the selected at least one VLAN so as to provide a service identified by the given service-ID using the selected at least one VLAN.

2. The communication system of claim 1, wherein
the first VLAN frame includes a connection request interface address identifying a connection interface via which the first VLAN frame has been transmitted from the base station to the Ethernet network, the service-ID associating information stores the service-ID and the at least one VLAN identifier in association with a connection interface address identifying a connection interface via which the base station is to establish a connection with at least one VLAN identified by the at least one VLAN identifier so as to provide a service identified by the service-ID, and each gateway, upon receiving the first VLAN frame transmitted from the base station via the Ethernet network, transmits one or more pieces of service-ID associating information each storing the service-ID and the at least one VLAN identifier in association with the connection interface address equal to the connection request interface address included in the received first VLAN frame, to the base station via the Ethernet network.

3. The communication system of claim 2, wherein
the base station stores the one or more pieces of service-ID associating information that have been transmitted from each gateway, the base station selects, from among the plurality of VLANs, at least one VLAN identified by the at least one VLAN identifier that is stored in association with the same service-ID as the given service-ID in the stored one or more pieces of service-ID associating information, and the base station establishes a connection with the selected at least one VLAN so as to provide a service identified by the given service-ID using the selected at least one VLAN.

4. The communication system of claim 1, wherein the gateway receives a pair of a service-ID and a connection interface address from a maintenance terminal that is connected to the gateway via the another network, and the gateway stores, as a piece of service-ID associating information, the received service-ID and the received connection interface address in association with a virtual network identifier identifying the one of the plurality of virtual networks.

5. The communication system of claim 1, wherein the base station retransmits the first VLAN frame when the base station fails to receive the service-ID associating information within a predetermined time period from previously transmitting the first VLAN frame.

6. A method for establishing a connection between a base station and a plurality of virtual LANs (VLANS) provisioned in an Ethernet network by using a switch and a plurality of gateways each belonging to a different one of the plurality of VLANs and connecting to the one of the plurality of VLANs with another network, the method comprising:

providing each gateway with service-ID associating information in which a service-ID identifying each of one or more services to be provided is stored in association with a VLAN identifier identifying a VLAN to be used for providing the each of the one or more services;

providing each gateway, the base station, and the switch with a predetermined VLAN-ID that is to be set to a VLAN tag of a VLAN frame and is not assigned to any one of the plurality of VLANs;

upon receiving from the base station a first VLAN frame including a predetermined VLAN-ID that is to be set to a VLAN tag of a VLAN frame and is not assigned to any one of the plurality of VLANs, broadcasting, by the switch, the received first VLAN frame to all of the plurality of gateways via the plurality of VLANs, before connections are established between the base station and the plurality of VLANs;

upon receiving the first VLAN frame including the predetermined VLAN-ID from the switch through a VLAN to which the each gateway belongs, transmitting, by each gateway, the service-ID associating information stored in the each gateway to the switch;

upon receiving the service-ID associating information from each gateway, transferring, by the switch, the received service-ID associating information to the base station;

upon receiving the service-ID associating information from the switch, storing, by the base station, the received service-ID associating information in a memory provided for the base station;

selecting, by the base station, from among the plurality of VLANs, at least one VLAN that is associated with a given service-ID by the service-ID associating information stored in the memory; and establishing, by the base station, a connection with the selected at least one VLAN so as to provide a service identified by the given service-ID using the selected at least one VLAN.

* * * * *